No. 779,244. PATENTED JAN. 3, 1905.
M. E. SPOFFORD.
VESSEL LINING.
APPLICATION FILED JUNE 14, 1902.
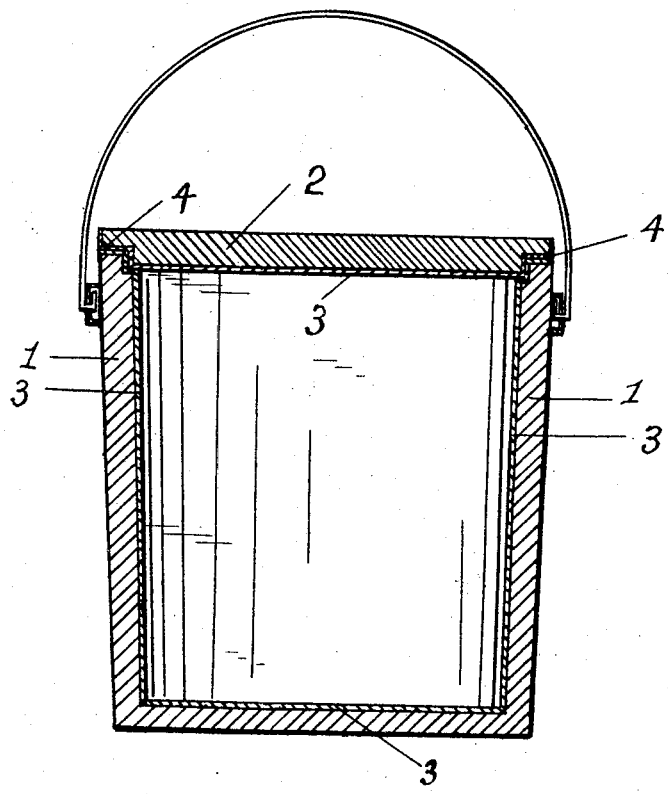
Witnesses
C. M. Catlin
A. H. Mater
Inventor
Marcellus E. Spofford
By Benj. R. Catlin
Attorney No. 779,244. Patented January 3, 1905.

UNITED STATES PATENT OFFICE.

MARCELLUS E. SPOFFORD, OF BENNINGTON, NEW HAMPSHIRE.

VESSEL-LINING.

SPECIFICATION forming part of Letters Patent No. 779,244, dated January 3, 1905.

Application filed June 14, 1902. Serial No. 111,698.

*To all whom it may concern:*

Be it known that I, MARCELLUS E. SPOFFORD, a resident of Bennington, in the county of Hillsboro and State of New Hampshire, have invented certain new and useful Improvements in Vessel-Linings; and I do hereby declare the following to be a full, clear, and exact description of the invention, such as will enable others skilled in the art to which it pertains to make and use the same.

The invention relates to vessel coating or lining, and has for its object to provide receptacles for butter, lard, and other like substances with an insipid, cheap, easily-applied, and efficient coating or lining.

The invention consists in the construction herein described and pointed out.

In the accompanying drawing the figure is a section of a pail made of vegetable fiber provided with a starch coating or lining, the thickness of the pail and of the lining being exaggerated.

Numeral 1 denotes a pail made of wood, wood fiber, paper, or other suitable material. 2 indicates a cover, and 3 an interior coating of starch. Neither the form nor material of the pail, vessel, or receptacle is essential, though the improvement was primarily intended and applied by me to so-called "fiber" pails for butter and lard, and I have found a starch lining applied substantially in the manner hereinafter described to be adherent, durable, and otherwise efficient.

I dissolve a pound of starch in about a pint of cold water and then add about three gallons of boiling water, the solution being stirred while it thickens. It is subsequently applied to the interior of the vessel either with a brush, or by slushing, or in any practicable way.

Pails thus lined or coated will not absorb animal fat, nor impart to substances such as butter, lard, and the like any ingredient, nor affect their taste, and the starch lining effectually prevents the vessel from absorbing any part of its contents.

If desired, the starch coating can be applied to the vessel-cover and may in some cases be extended to the exterior of the cover or of the vessel-body, or of both, as indicated at 4 in the drawing.

In practice and preferably the starch coating is partially absorbed by the pervious wood or paper, so that no distinctly-separable layer is formed exteriorly to the surface of the vessel, the coating being inconspicuous both by reason of its tenuity and transparency.

In case the pail or other vessel is made of fiber starch can be incorporated with the fiber before or during the manufacture of the vessel as an equivalent for a lining applied subsequently.

I am aware that vessels have been coated with shellac protected by a layer of paper and also with a mixture of gum-arabic and rice-flour paste. I am also aware that it has been proposed to coat box or bag linings and other articles with size, paste, and like plastic materials. My improvement relates to unlined receptacles for butter and the like and involves the use of a coating of starch, which being insipid, comparatively free from decomposition, and attack from germs and from absorption by the containing vessel I have discovered to be specially adapted for the purposes herein set forth. My improvement in vessels such as pails is characterized by a lining of starch either superficially applied or mixed in the material of which the vessel is made.

I am aware that fabrics have been stiffened by applying thereto raw starch and then cooking it with dry steam, care being taken not to fill the meshes of the fabric, and I am also aware that ozocerite has been used for coating ale and beer casks, and such matters are disclaimed, my invention being characterized by a vessel-coating of pure starch.

An important feature of starch lining for vessels is that it resists the action of heat. For example, hot lard poured into a starch-coated vessel does not injuriously affect the coating. The lard in such cases does not penetrate nor discolor the wood nor in any manner injure the coating either when the lard is poured or after months of use. This is a result not attained by any other coating or lining now in common use nor by any other known to me.

My attention has been called to a description of a vessel coated with a composition of rice-flour paste and gum-arabic. Such coating is not insipid. It is more liable to crack than one of pure starch, owing, as I believe, in part to the greater frangibility of the gum and to its greater expansibility and possibly to one of the constituents of rice. A coating of rice-flour paste and gum imparts also a color to the coated vessel objectionable for some purposes—as, for example, in vessels for pure lard. The expense of such coating is comparatively great, and vessels lined with such a composition are hereby disclaimed.

Having thus described my invention, what I claim as new, and desire to secure by Letters Patent, is—

1. A pail or other vessel for holding butter, hot lard, essential oil or the like, coated interiorly with an adherent layer of pure starch.

2. A pail or other vessel for holding butter, hot lard, essential oil or the like, coated interiorly with an adherent layer of pure starch, and having a cover coated with starch, and a starch coating between the cover and vessel-rim.

3. A pail or other vessel for holding butter, hot lard, essential oil or the like, coated interiorly with an adherent layer of starch, and having a cover coated with starch, and a starch coating between the cover and vessel-rim.

4. A pail or other vessel of fiber and starch for holding butter, hot lard, essential oil or the like, the starch being mixed with the material of the vessel.

In testimony whereof I have signed this specification in the presence of two subscribing witnesses.

MARCELLUS E. SPOFFORD.

Witnesses:
CALVIN S. BROWN,
GEORGE M. BROWN.